(12) United States Patent
Hofmann et al.

(10) Patent No.: US 12,337,404 B2
(45) Date of Patent: Jun. 24, 2025

(54) TRANSPORT SYSTEM FOR TRANSPORTING ITEMS TO BE SOLDERED THROUGH A SOLDERING SYSTEM, AND SOLDERING SYSTEM

(71) Applicant: ERSA GmbH, Wertheim (DE)

(72) Inventors: Uwe Hofmann, Würzburg (DE); Lothar Endreß, Wertheim (DE)

(73) Assignee: ERSA GMBH, Wertheim (DE)

( * ) Notice: Subject to any disclaimer, the term of this patent is extended or adjusted under 35 U.S.C. 154(b) by 0 days.

(21) Appl. No.: 18/706,718

(22) PCT Filed: Oct. 24, 2022

(86) PCT No.: PCT/EP2022/079550
§ 371 (c)(1),
(2) Date: May 1, 2024

(87) PCT Pub. No.: WO2023/083592
PCT Pub. Date: May 19, 2023

(65) Prior Publication Data
US 2025/0058393 A1     Feb. 20, 2025

(30) Foreign Application Priority Data
Nov. 9, 2021     (DE) ...................... 10 2021 129 079.1

(51) Int. Cl.
*B23K 3/00*     (2006.01)
*B23K 1/008*     (2006.01)
(Continued)

(52) U.S. Cl.
CPC ............... *B23K 1/008* (2013.01); *B23K 3/08* (2013.01); *B23K 37/047* (2013.01); *F27B 9/00* (2013.01);
(Continued)

(58) Field of Classification Search
CPC .......... B23K 1/008; B23K 3/08; B23K 37/04; B23K 37/047; F27B 9/00; F27D 2003/0059; F27D 2003/0072
(Continued)

(56) References Cited

U.S. PATENT DOCUMENTS 3,604,611 A * 9/1971 Lamberty ................. B23K 1/20
228/180.1
4,390,120 A * 6/1983 Broyer ................. B23K 3/0653
228/180.1
(Continued)

FOREIGN PATENT DOCUMENTS

CN     105772887 A  *  7/2016
CN     107175419 A  *  9/2017 ............. B23K 31/02
(Continued)

OTHER PUBLICATIONS

International Search Report for application No. PCT/EP2022/079550 with English translation mailed Mar. 16, 2023, 5 pages.
(Continued)

*Primary Examiner* — Kiley S Stoner
(74) *Attorney, Agent, or Firm* — Carter, DeLuca & Farrell LLP

(57) ABSTRACT

A transport system (34) for transporting soldering material through a soldering apparatus (10), includes a transport track (38, 40) extending in a transport direction (18). The transport track includes transport rails (42, 44, 46, 48). Coupling elements (72, 120) are provided on a transport rail (42, 44, 46). The coupling elements include guide elements (58, 60, 61) which interact with transverse rods (46) that extend in a transverse direction (54) relative to the transport direction. Each coupling element includes a guide part (100) having the respective guide element (58, 60, 61) and a fastening part (102) fastened to the respective transport rail such that the fastening part can be displaced relative to the guide part so (Continued)

that the distance in the transverse direction between the transport rail and the respective guide part changes.

10 Claims, 7 Drawing Sheets

(51) Int. Cl.
  *B23K 3/08*      (2006.01)
  *B23K 37/00*     (2025.01)
  *B23K 37/047*    (2006.01)
  *F27B 9/00*      (2006.01)
  *F27D 3/00*      (2006.01)
(52) U.S. Cl.
  CPC ............... *F27D 2003/0059* (2013.01); *F27D 2003/0072* (2013.01)
(58) Field of Classification Search
  USPC ............... 228/43, 47.1, 49.5, 179.1–180.22
  See application file for complete search history.

(56) References Cited

U.S. PATENT DOCUMENTS

| | | | |
|---|---|---|---|
| 6,032,788 A | | 3/2000 | Smithers et al. |
| 6,267,819 B1 | | 7/2001 | Doyle et al. |
| 2016/0279743 A1 | * | 9/2016 | Surasing ............... H05K 3/3494 |
| 2018/0141168 A1 | | 5/2018 | Sugihara et al. |
| 2023/0143981 A1 | * | 5/2023 | Hofmann ............... B23K 37/04 228/47.1 |

FOREIGN PATENT DOCUMENTS

| | | | | | |
|---|---|---|---|---|---|
| CN | 108098106 A | * | 6/2018 | ............... | B23K 3/08 |
| CN | 110142478 A | * | 8/2019 | ............... | B23K 3/00 |
| CN | 111097986 B | * | 9/2021 | ............... | B23K 3/00 |
| CN | 113492240 A | * | 10/2021 | ............... | B23K 3/04 |
| CN | 114603227 A | * | 6/2022 | ............... | B23K 1/085 |
| CN | 114654041 A | * | 6/2022 | ............... | B23K 3/00 |
| CN | 216852992 U | * | 6/2022 | ............ | B23K 1/0016 |
| CN | 110434420 B | * | 5/2024 | ............... | B23K 3/00 |
| CN | 117961391 A | * | 5/2024 | | |
| CN | 118002879 A | * | 5/2024 | | |
| CN | 118060655 A | * | 5/2024 | | |
| DE | 102005055283 A1 | | 5/2007 | | |
| DE | 10 2019 125 981 A1 | | 4/2021 | | |
| DE | 10 2019 128 780 A1 | | 4/2021 | | |
| DE | 102021129079 B3 | * | 11/2022 | ............. | B23K 1/008 |
| EP | 377336 A | * | 7/1990 | ............. | B23K 1/085 |
| EP | 3241767 B1 | | 3/2019 | | |
| JP | S63177958 A | | 7/1988 | | |
| JP | 2011171714 A | * | 9/2011 | ............... | B23K 1/00 |
| KR | 101812068 B1 | * | 12/2017 | | |
| KR | 101922902 B1 | * | 11/2018 | | |
| WO | WO-2007137952 A1 | * | 12/2007 | ............. | B23K 1/008 |

OTHER PUBLICATIONS

Examination Report on Patentability for appln. no. DE 10 2021 129 079.1 dated Aug. 1, 2022 with English translation, 13 pages.
International Preliminary Report on Patentability, for appln. No. PCT/EP2022/079550 dated Jul. 5, 2023 with English Translation.

* cited by examiner

TRANSPORT SYSTEM FOR TRANSPORTING ITEMS TO BE SOLDERED THROUGH A SOLDERING SYSTEM, AND SOLDERING SYSTEM

The invention relates to a transport system for transporting soldering material through a soldering apparatus with at least one transport track extending in the transport direction, wherein the transport track comprises at least two transport rails. The soldering material can take the form of a printed circuit board populated with electronic components or of a goods carrier for goods, and in particular for printed circuit boards populated with electronic components. The soldering apparatus can in particular be a reflow soldering apparatus for the continuous soldering of printed circuit boards populated with electronic components or be a drying system for drying populated printed circuit boards.

Such transport systems generally grip the respective soldering material at the edges running parallel to the transport direction and convey said soldering material in the transport direction by means of transport rails, in which, for example, chain conveyors run. The transport rails can have a length of several meters and be composed of a plurality of rail sections. Such transport rails are also referred to as transport bars. Furthermore, it is known to provide, in addition to the two outer transport rails supporting the soldering material at the edges, a further transport rail for a central support supporting the soldering material in the central region. Central supports are advantageous in particular when comparatively large printed circuit boards or goods carriers are soldered or dried. They prevent the soldering material from bending or sagging in the central region, which can occur, in particular, due to the heating of the soldering material, and therefore ensure functionally reliable transport.

The invention also relates to a soldering apparatus, in particular a reflow soldering apparatus for the continuous soldering of populated printed circuit boards or a drying system for drying populated printed circuit boards in which soldering material can be transported along a transport direction.

Reflow soldering apparatuses can be used to solder what are known as SMD components (surface-mounted devices) onto the surface of printed circuit boards by means of soldering paste. The soldering paste, which is in particular a mixture of metal solder granules, flux and pasty components, is applied or printed onto the surface of the printed circuit boards for reflow soldering. Subsequently, the components to be soldered are placed into the soldering paste. In the reflow soldering process, the soldering material, i.e., the assembly consisting of a printed circuit board, soldering paste and components to be soldered, is preheated along the process channel in a preheating zone, and heated in a soldering zone to a temperature above the melting point of the soldering paste. As a result, the soldering paste melts, and the soldering joints are formed. In a cooling zone, if one is present, the soldering material is cooled until the melted solder solidifies before being removed from the reflow soldering apparatus.

In reflow soldering apparatuses, the process channel is generally formed by two channel halves, one upper and one lower channel half. The lower channel half is provided in or on a base body, and the upper channel half is provided in or on a hood. Further components such as, for example, nozzle plates, fan units, air ducts conducting the process gas, filter elements and/or cooling elements, are generally provided in or on the process channel, or in or on the base body and in or on the hood. Overall, a desired temperature profile is thereby provided along the transport direction in the process channel, wherein the process gas is blown into the process channel, sucked out therefrom, in particular cooled in the cooling zone, cleaned, and fed back to the process channel.

Soldering systems having transport units for transporting soldering material are known from DE 10 2019 128 780 A1 and DE 10 2005 055 283 A1. Furthermore, it is known from DE 10 2019 125 981 A1 to provide a transport system for transporting soldering material through a soldering apparatus having two transport tracks running parallel to one another and extending in the transport direction, wherein each of the transport tracks comprises at least two transport rails running parallel to one another and extending in the transport direction. In order to be able to accommodate different sizes and, in particular, different widths of soldering material, it is also known that the transport tracks are designed to be width-adjustable transversely to the transport direction.

U.S. Pat. No. 6,032,788 A discloses a multi-rail transport system for transporting printed circuit boards along adjacent rail pairs with first and second brake rods with parallel longitudinal axes and a plurality of brake cylinders.

It has been shown that, especially when the transport tracks are comparatively long, setting the parallelism of the transport rails over their longitudinal extension is not readily possible. Setting the parallelism of the transport rails is particularly difficult if they are designed to be width-adjustable for transporting soldering material of different widths.

The object of the invention is to provide a transport system for transporting soldering material through a soldering system and a soldering system with a transport system, in which setting the parallelism of the individual transport rails is possible in a functionally reliable manner in the simplest possible manner.

This object is achieved by a transport system having the features of claim 1. Consequently, it is provided, in particular, that a plurality of coupling elements are provided on at least one transport rail, wherein the coupling elements comprise guide elements which interact with transverse rods which extend in a transverse direction running transversely to the transport direction, and wherein the coupling elements each comprise a guide part having the respective guide element and a fastening part fastened to the respective transport rail. The design is such that the fastening part is adjustable relative to the guide part, so that the distance in the transverse direction between the transport rail and the respective guide part changes.

Due to the fact that the coupling parts each comprise two components which can be adjusted relative to one another and can be fixed to one another, namely the guide part and the fastening part, it is possible in a simple manner to adjust the individual transport rails in the region of the respective guide part in the transverse direction. Such an adjustment of the respective fastening part and thus of the associated guide part in the transverse direction can take place in all coupling elements until the respective transport rail is optimally aligned in the longitudinal direction. For the adjustment of the guide parts or fastening parts, they are then preferably to be fixed. Overall, very long transport rails which can extend over five, ten or more meters can thereby also be aligned comparatively easily.

The process must be performed at least during installation or setup of the transport system. If, as a result of the operation of the transport system, a transport rail becomes misaligned at one or more locations in the longitudinal direction, this can be remedied in a simple manner by correspondingly resetting or readjusting the fastening part and thus the guide part.

The at least one transport rail to be adjusted can be a transport rail which supports the soldering material at its edges or also a transport rail which serves for central support.

Furthermore, it is provided that the fastening parts are arranged on the respective transport rail in an axially adjustable and fixable manner and if the fastening parts each have an actuating section and the guide parts each have a counter-section interacting with the associated actuating section. The actuating section and/or the counter-section enclose an acute angle with the transport direction, so that the distance in the transverse direction between the transport rail and the respective guide part changes when the fastening part is adjusted axially. The arrangement is in particular such that the transverse rods are arranged in a stationary manner. By axially adjusting the fastening part on the respective transport rail, the transport rail is consequently adjusted in the transverse direction in the region of the fastening part. The axial movement of the fastening element is converted into a transverse movement due to the acute angle which the actuating section or the counter-section sets with the transport direction. Depending on the size of the acute angle, the transmission ratio consequently changes from the axial movement of the fastening element to the adjustment of the rail in the region of the respective fastening element in the transverse direction. Consequently, only the respective fastening part is actively adjusted; the associated guide part is automatically adjusted.

It is advantageous here if the respective actuating section bears at least in sections against the respective counter-section in a displaceably guided manner.

Furthermore, it is advantageous if the respective actuating section or the respective counter-section has a sliding receptacle for the respective sliding section or the respective actuating section. The sliding receptacle may, in particular, have a groove-like design. The sliding receptacle may also have undercuts and/or have a dovetail-like design in order to achieve a suitable movement coupling between the respective movement rail and the associated guide part.

Furthermore, it is conceivable that the respective actuating section or the respective counter-section has an elongated hole extending in the transport direction, which elongated hole can be open at the edge in the longitudinal direction of the elongated hole or can be closed at the edge. A fixing element for fixing the respective guide part to the respective fastening part, after corresponding adjustment of the fastening part in the axial direction, is advantageously provided in the respective elongated hole. The fastening part is, in particular, designed such that, in a release position, it allows the fastening part to be adjusted in the axial direction and that it fixes the respective guide part on the fastening part in a fixing position, when the respective transport rail is aligned in the longitudinal direction.

The fixing element may be designed, in particular, as a fastening screw. A screw of this type may have a thread which can be screwed into the guide part or fastening part. The fastening screw may also have a screw head which, in the fixing position, presses the fastening part against the guide part.

Furthermore, it is advantageous if, for the width adjustment of the at least one transport track, at least one of the width transport rails is adjustable in a transverse direction running transversely to the transport direction, wherein guide elements adjacent in the transverse direction of transport rails adjustable in the transverse direction are each guided on the same transverse rod so as to be displaceable toward and away from one another in the transverse direction. A transport rail can thereby be adjusted parallel to the other transport rails over its entire length parallel to the other transport rails in a simple manner.

According to one embodiment of the invention, it is provided that, in particular between the transport rails and the transverse rods, rotatably drivable rotary rods running parallel to the transport rails are provided, that the coupling elements each have a rotary receptacle for the respective rotary rod, and that the transverse rods have a toothing on their side facing the respective transport rail, which toothing meshes with gear wheels provided on the respective rotary rods. By rotating the individual rotary rods, the associated transport rails can consequently be displaced in the transverse direction. In order to achieve a uniform displacement over the entire length of the transport rails, the transverse rails have a toothing that meshes with gear wheels provided on the rotary rods. In other words, if the respective rotary rod is rotated, it is ensured that the associated transport rod is uniformly adjusted over its entire length parallel to the transport direction. The respective transport rail is guided in a functionally reliable manner by the respective associated coupling elements or the associated guide elements on the respective transverse rods.

Furthermore, it is conceivable that on the respective free end of the respective rotary rod a motor for rotatably driving the respective rotary rod is provided. During the width adjustment of the individual transport rails, the motors then move together with the respective transport rail. Overall, a compact design can thereby be achieved.

Furthermore, it is advantageous if drivable transport chains are provided on which preferably the edges of the soldering material and of the transport along the transport direction come to rest, wherein the transport chains run at least in portions inside the transport rails. For this purpose, the transport rails can be designed, for example, as profile elements.

The aforementioned object is also achieved by a soldering apparatus, in particular a reflow soldering apparatus or a drying system, in which soldering material can be transported along a transport direction, wherein such a soldering apparatus provides a transport system according to the invention.

Further details of the invention can be found in the following description, on the basis of which an embodiment of the invention is described and explained in more detail.

Figure 1:
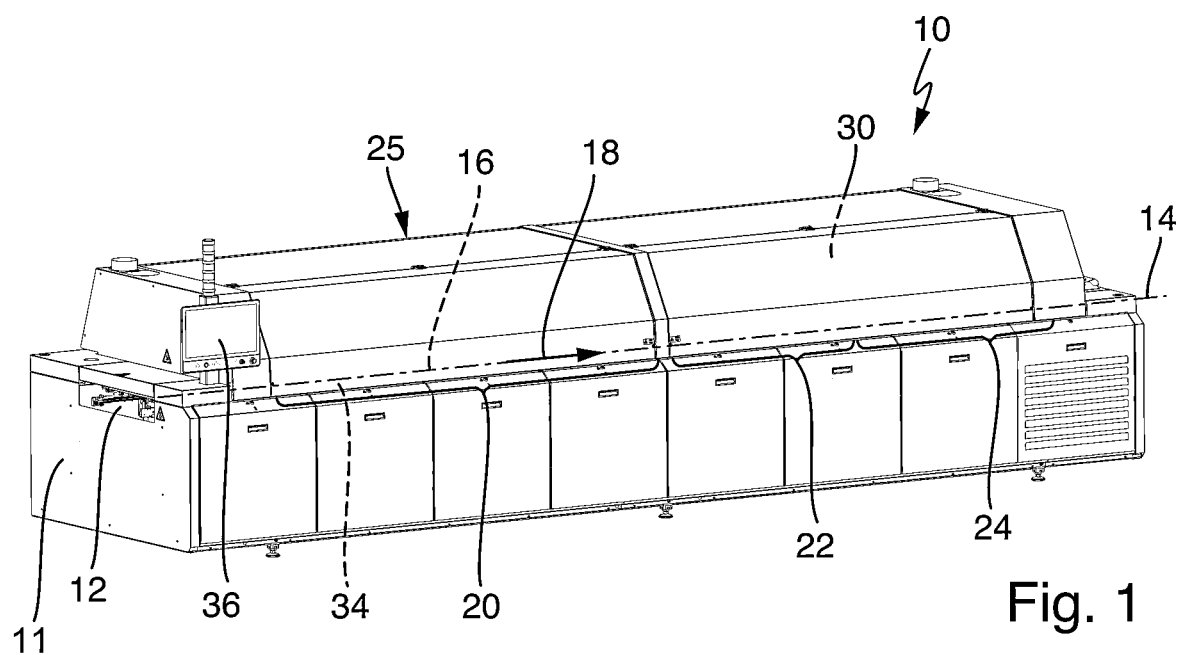
FIG. 1 is a side view of a reflow soldering apparatus.

FIG. 1 shows a reflow soldering apparatus 10 for the continuous soldering of soldering material. The reflow soldering apparatus 10 has an entry 12 and an exit 14, wherein the soldering material that is to be soldered reaches the reflow soldering apparatus 10 via the entry 12 and is discharged from the reflow soldering apparatus 10 via the exit 14. The soldering material is transported along a transport direction 18 through a process channel 16 indicated in FIG. 1. A preheating zone 20, a soldering zone 22 and a cooling zone 24 are provided in the process channel 16.

Figure 2:
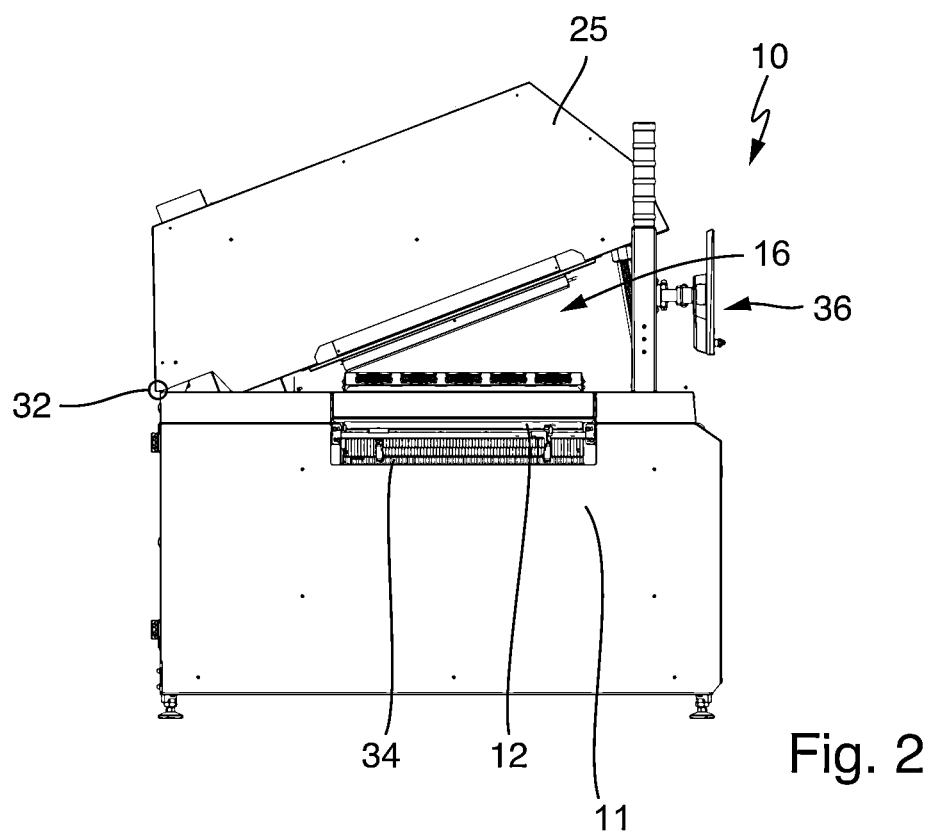
FIG. 2 is a front view of the reflow soldering apparatus according to FIG. 1.

As is clear from FIGS. 1 and 2, a communications unit 36 is provided with a display screen and an input device by means of which it is possible to communicate with a machine controller of the reflow soldering apparatus 10.

The soldering material, that is to say the printed circuit board provided with the soldering paste and populated with electronic components, is first heated in the preheating zone 20 to a temperature which is below the melting temperature of the soldering paste. In the soldering zone 22, the printed circuit board is heated for a certain duration to a process temperature which is above the melting point of the soldering paste so that it melts in the soldering zone in order to solder the electronic components to the printed circuit board. In the cooling zone 24, the soldering material is cooled such that the liquid solder solidifies before the soldering material is removed at the exit 14 of the reflow soldering apparatus 10.

A transport system 34 is provided inside the reflow soldering apparatus 10 for transporting the printed circuit boards along the transport direction 18.

As is also clear from FIG. 2, the reflow soldering apparatus 10 has a base body 11 and a cover hood 25. The cover hood 25 can be pivoted open about a hood axis 32 extending parallel to the transport direction 18. By the cover hood 25 pivoting open, the interior of the process channel 16 and the transport system 34 becomes accessible in order to check visually, maintain, clean, set up, replace, and optionally repair them.

Figure 3:
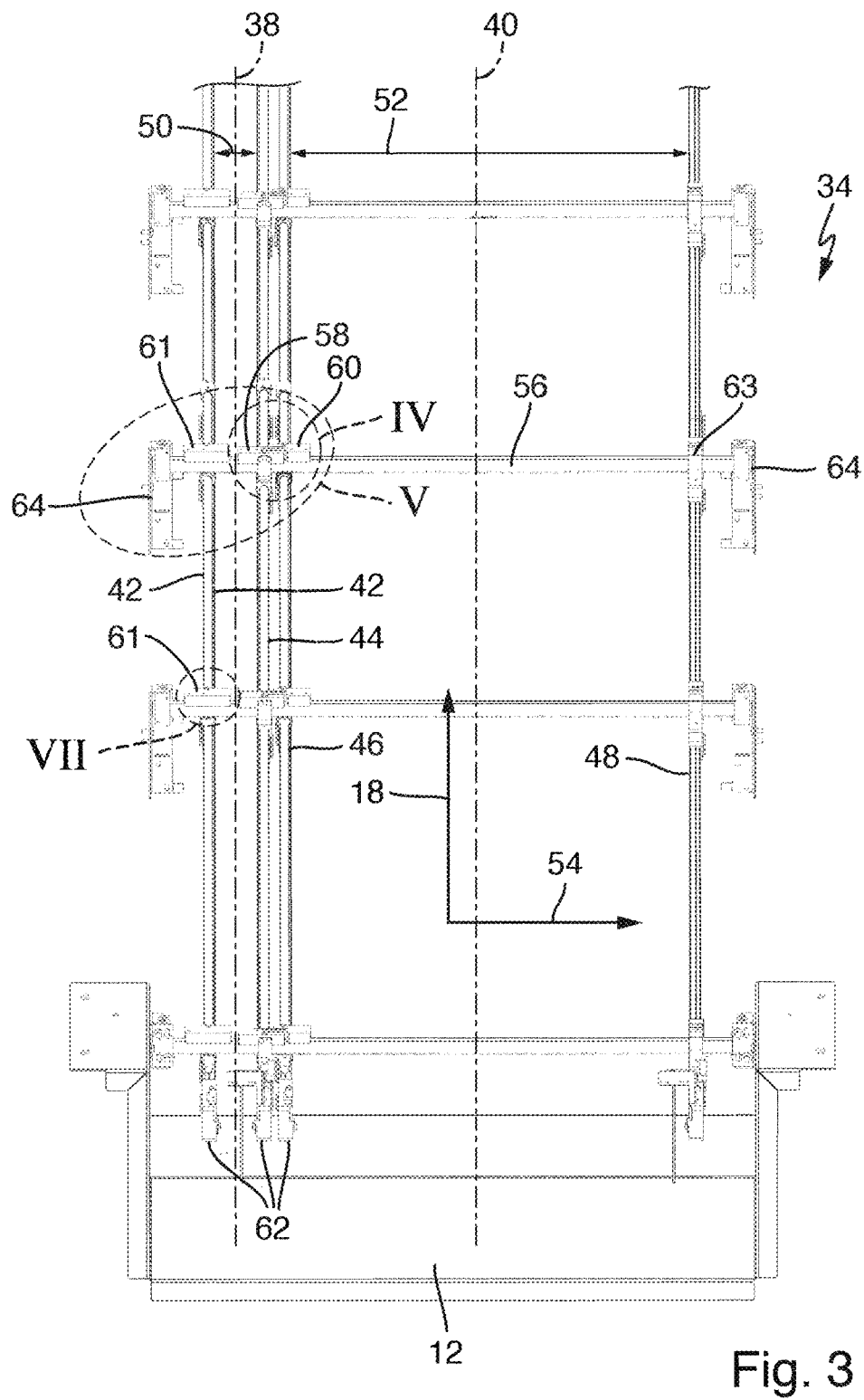
FIG. 3 shows a detail of a transport system of the soldering apparatus according to FIG. 1 and FIG. 2.

FIG. 3 is a plan view of a detail of the transport system 34. The transport system 34 comprises two transport tracks 38 and 40 running parallel to one another in the transport direction 18. The two transport tracks 38 and 40 are each delimited by two transport rails 42, 44 and 46, 48. It would be conceivable for a central support having a further transport rail for supporting the soldering material in the central region to be provided between the transport rails 42, 44 and 46, 48.

For adjusting the width 50 of the transport track 38 or the width 52 of the transport track 40, the adjacent transport rails 44 and 46 of the two transport tracks 38 and 40 are adjustable in the transverse direction 54. Furthermore, the transport rail 42 is adjustable in the transverse direction 54. In the embodiment shown, the transport rail 48 is not adjustable in the transverse direction 54. In the setting of the transport system 34 shown in FIG. 3, the track 40 is set with its width 52 comparatively wide and the track 38 is set with its width 50 comparatively narrow.

As is clear from FIG. 3, transverse rods 56 extending in the transverse direction 54 are provided, which transverse rods are provided, in particular, for guiding and holding the transport rails 42, 44, 46 that are adjustable in the transverse direction 54.

In order to adjust the central transport rails 44 and 46, a plurality of coupling elements 72 are provided on each of the transport rails 44 and 46, each of which comprises guide elements 58 and 60. The transport rail 42 also provides coupling elements 72 having guide elements 61. For guiding the transport rails 42, 44, 46, the guide elements 58, 60, 61 rest with their underside on the upper side of the respective transverse rods 56. As is clear from FIG. 3, the guide elements 58, 60 and 61 of different transport rails 44, 46, which guide elements are adjacent in the transverse direction 54, are each displaceable in the transverse direction 54 on the same transverse rod 56. The free ends of the transverse rods 56 are each fixed with supports 64 in a stationary manner inside the soldering apparatus 10.

Figure 4:
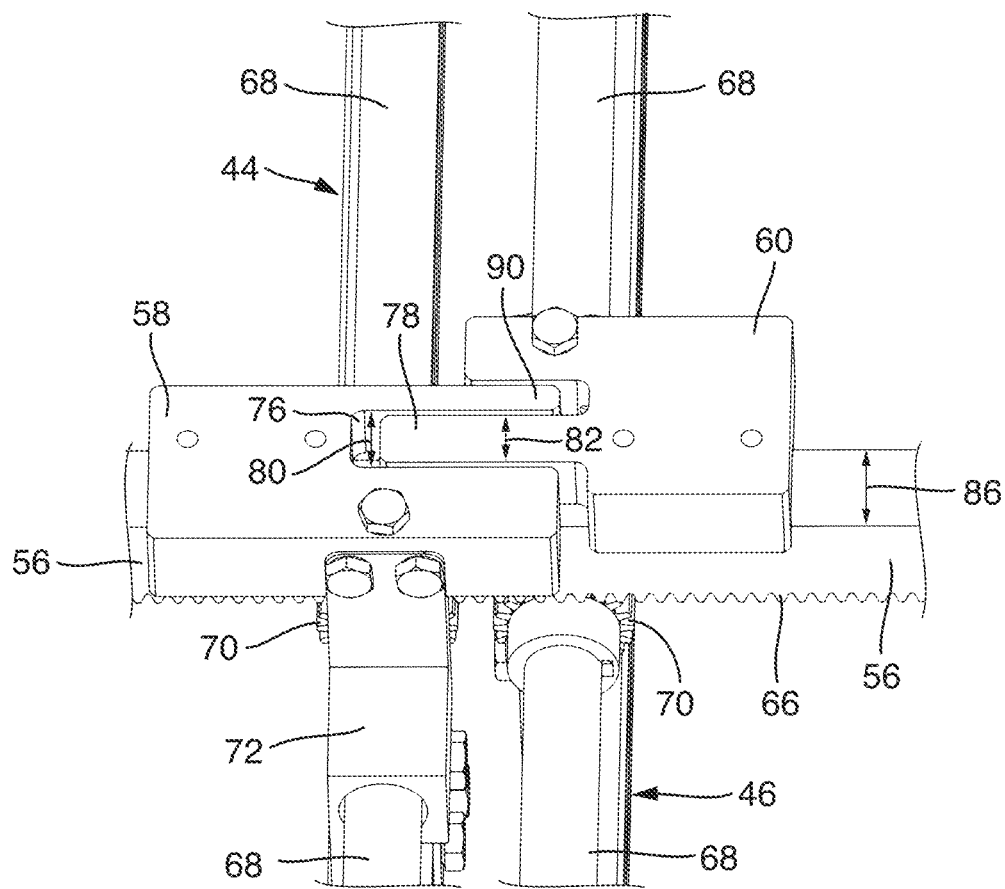
FIG. 4 shows an enlarged detail IV from FIG. 3.
Figure 5:
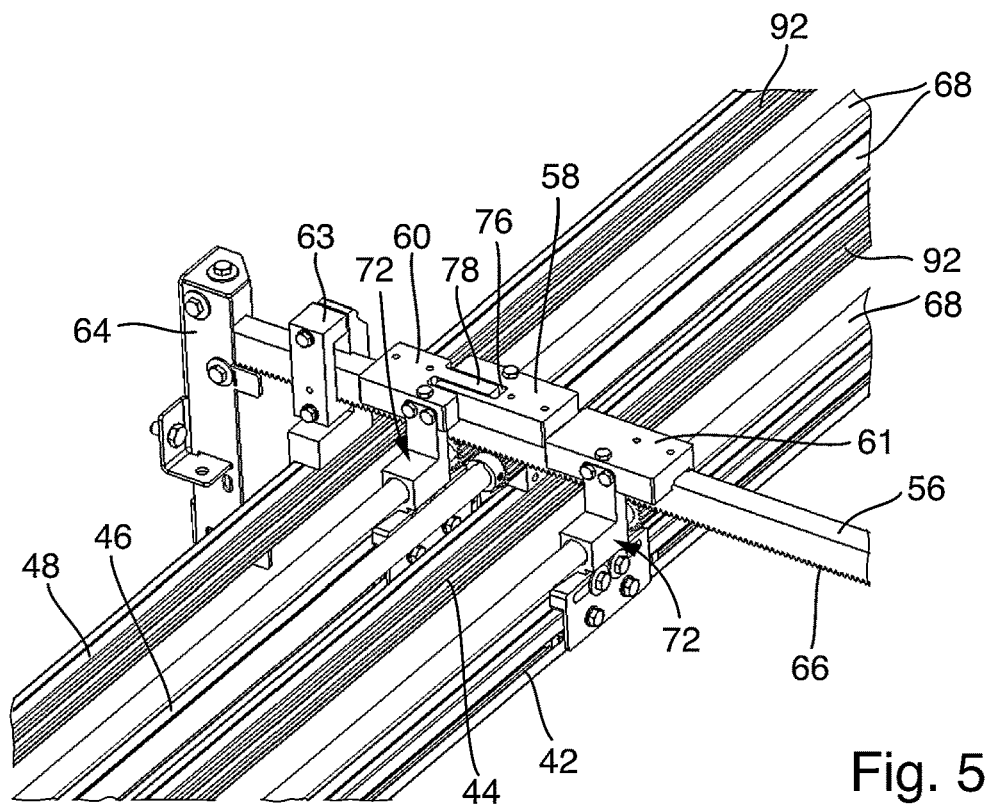
FIG. 5 shows an enlarged detail V from FIG. 3.
Figure 6:
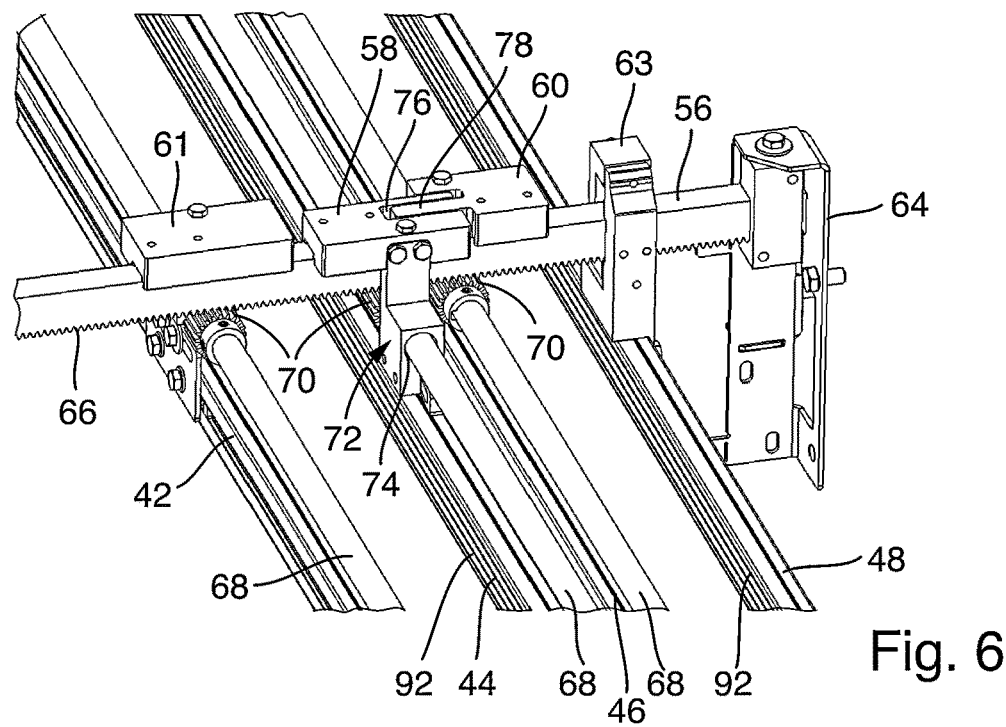
FIG. 6 is another perspective view according to FIG. 5.

As is clear from FIGS. 4, 5 and 6, the transverse rods 56 each have a toothing 66 on their lower side facing the transport rails 42, 44, 46. The upper side of the transverse rods 56 is flat such that the guide elements 58, 60 and 61 can be guided slidingly thereon.

In this case, rotatably drivable rotary rods 68 running parallel to the transport rails 42, 44, 46 are provided between the transport rails 42, 44, 46 and the transverse rods 56. A plurality of identical gear wheels 70 that mesh with the toothings 66 of the transverse rods 56 are each provided on the rotary rods 68.

The coupling elements 72 are fastened to the transport rails 42, 44, 46 and each comprise the guide element 58, 60 and 61 as well as a rotary receptacle 74 for rotatably receiving the respective rotary rod 68.

As is clear from FIG. 3, motors 62 with which the rotary rods 68 can be rotatably driven are provided at the free ends of the rotary rods 68 in the region of the entry 12. The arrangement is such that by rotating the rotary rods 68 or the gear wheels 70, the transport rails 42, 44, 46 can be adjusted toward or away from one another in the transverse direction 54 on the transverse rails 56. In contrast, the transport rail 48 is fastened to the transverse rod 56 in a clamping manner by means of a plurality of clamping elements 63.

In order to ensure that the two central transport rails 44, 46 can be moved toward one another as far as possible without the transport rails 44, 46 being hindered by the guide elements 58, the guide elements 58, 60 of the two central transport rails 44 and 46 have a special design.

As is clear from FIGS. 4, 5 and 6, the guide element 58 has a recess 76 that extends in the transverse direction 54 and is designed in such a way that a projection 78 extending likewise in the transverse direction 54 on the respective associated guide element 60 can engage in the respective recess 76.

FIG. 4 shows how the projection 78 engages in the recess 76. The projection 78 is formed complementarily to the recess 76. Due to the provision of the recess 76 or of the projection 78, the two adjacent transport rails 44, 46 can be moved toward one another as far as possible, wherein secure guidance of the transport rails 44, 46 by the guide elements 58, 60 on the respective transverse rod 56 is nevertheless ensured.

Both the recess 76 and the projection 78 are designed in such a way that they have a width 80, 82 in the transport direction that is in each case smaller than the width 86 of the transverse rods 56 extending in the transport direction 18.

As is clear in particular from FIG. 4, it is also conceivable for at least one of the guide elements 60 to have not only a projection 78 but also a recess 88 for a projection 90 provided on the other guide element 58. It is important that the design is such that the adjacent transport rails 44, 46 of different transport tracks 38, 40 can be moved toward one another as far as possible without being hindered by the guide elements 58, 60, specifically in such a way that the guiding of the transport rods 44, 46 by the guide elements 58, 60 is not adversely affected thereby.

As is clear in particular from FIGS. 5 and 6, the guide elements 61 of the one outer transport rail 42 are cuboid.

It can be seen from FIGS. 5 and 6 that the transport rails 42, 44, 46 and 48 are designed as half-profiles 92 in which drivable transport chains are provided onto which the free edges of the soldering material can be placed for transport through the soldering apparatus 10.

In particular before the transport system 34 is put into operation, it is necessary to align the individual transport rails 42, 46, 44, 48 precisely in the transport direction or parallel to one another. The outer transport rail 48, which is not adjustable via the rotary rods 68, can be aligned over its length by means of the clamping elements 63. The clamping elements 63 can be adjusted on the transverse rods 56 in the transverse direction 54 and ultimately fixed.

Such a setting of the rails 42, 44, 46, which can be adjusted in the transverse direction 54, is not readily possible due to the provision of the rotary rods 68 and the gear wheels 72 that mesh with the transverse rods 66. In order nevertheless to be able to align these transport rails 42, 44, 46 precisely parallel in the transport direction, it is provided that the coupling elements 72 each have a guide part 100 on which the respective guide element 58, 60, 61 is fastened, and a fastening part 102 that is fastened to the respective transport rail 42, 44, 46 in such a way that the respective fastening part 102 is designed to be adjustable and fixable relative to the associated guide part 100 in the transverse direction 54. By adjusting the fastening part 102 relative to the guide part 100 in the transverse direction 54, the respective transport rail 42, 44, 46 can consequently be aligned in the transport direction 54.

Figure 7:
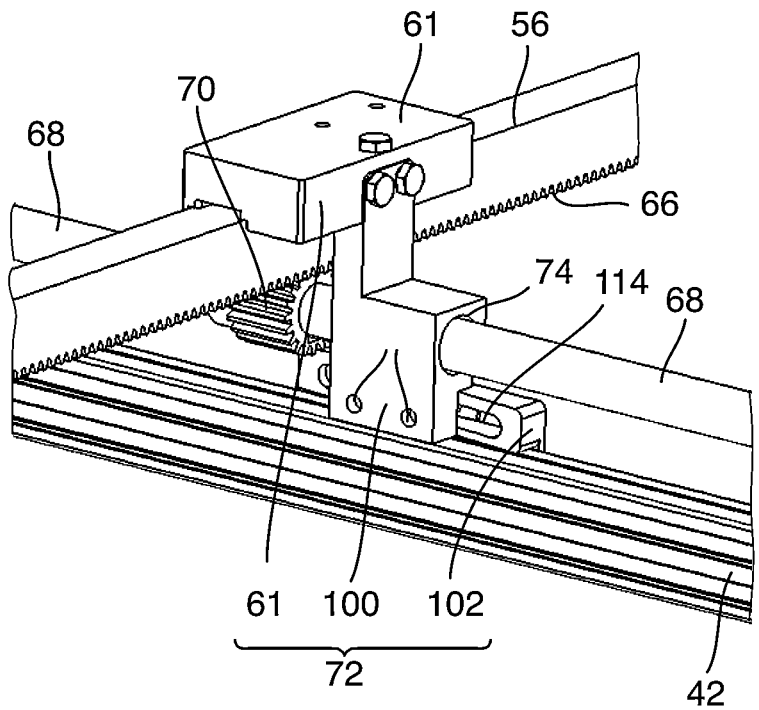
FIG. 7 shows an enlarged detail VII from FIG. 3.
Figure 8:
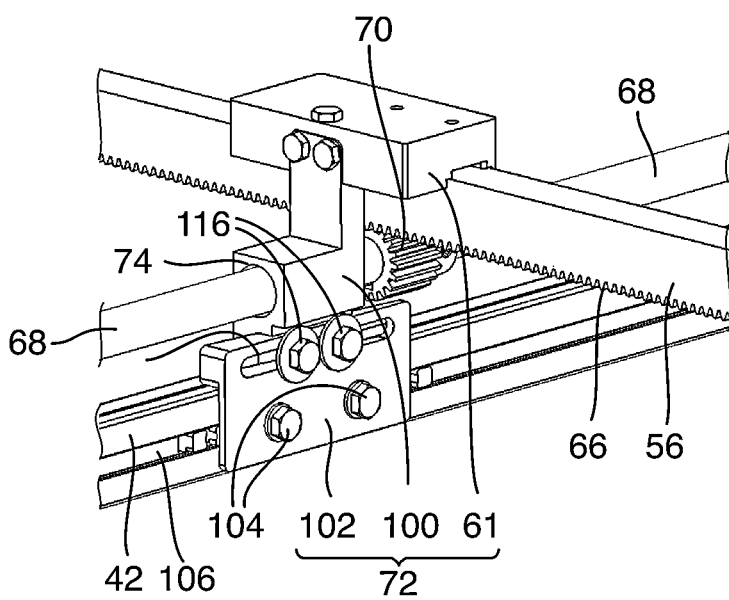
FIG. 8 is another perspective view according to FIG. 7.

In FIG. 7 and FIG. 8, which each show the transport rail 42 in isolation with the associated coupling element 72, it becomes clear that the coupling elements 72 are formed from the fastening part 102 fastened to the transport rail 42 and the guide part 100, wherein the associated guide element 61 is arranged on the respective guide part 100.

The coupling elements 72, which are provided on the transport rails 44 and 46, have a corresponding, at least two-part design, in each case having a fastening part 102 and a guide part 100, such as the coupling elements 72 shown in FIGS. 7 and 8.

As is clear in particular from FIG. 7, the fastening parts 102 are axially adjustable on the respective transport rail 42, 44, 46 in the transport direction 18. For fastening, fastening screws 104 are provided that correspond to slot nuts that are displaceably guided in an axial groove 106 on the respective transport rail 42, 44, 46. By releasing the screws 104, the respective fastening part 102 is consequently displaceable in the axial direction. By tightening the screws 104, the respective fastening part 102 is fastened in place on the respective transport rail 42, 44, 46.

Figure 9:
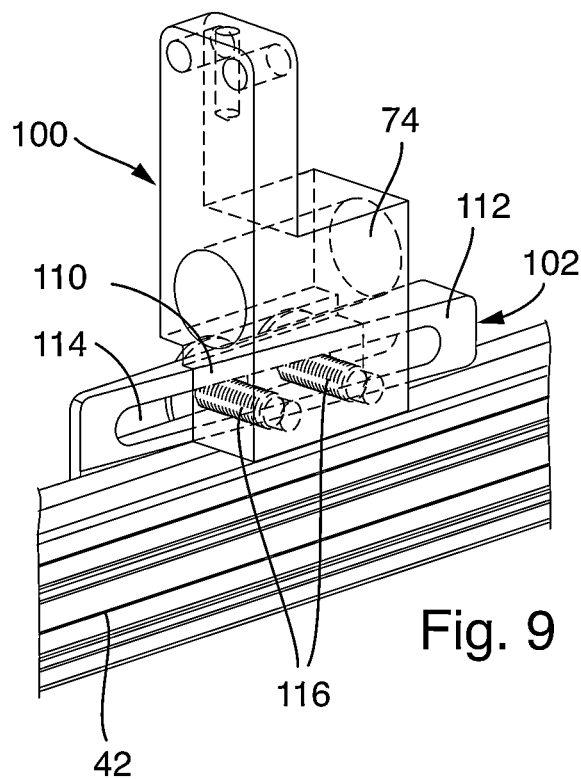
FIG. 9 is a perspective view of the coupling element shown in FIGS. 7 and 8.
Figure 10:
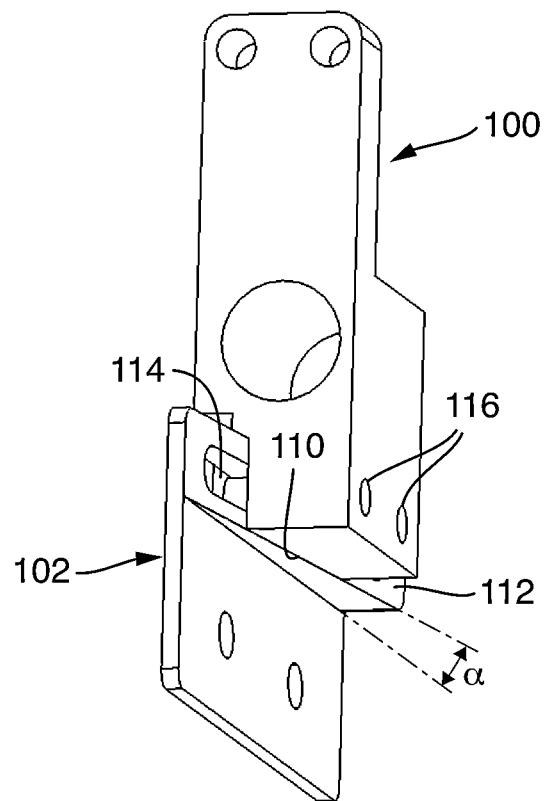
FIG. 10 is another perspective view of the coupling element according to FIG. 9.
Figure 11:
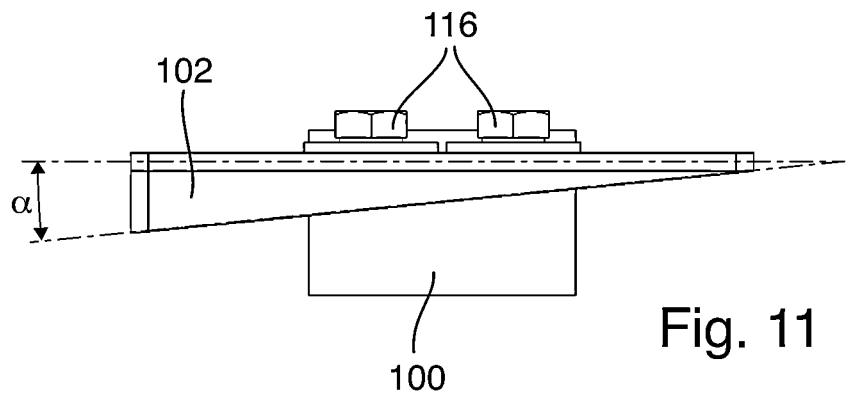
FIG. 11 is the plan view of the coupling element according to FIGS. 9 and 10.

As is clear in particular from FIGS. 9 to 11, the respective fastening part 102 has an actuating section 112 and the respective guide part 100 has a counter-section 110 interacting with the actuating section 112. The respective actuating section 112 and the associated counter-section 110 are formed lying flat against one another and enclose an acute angle α with the transport direction 18, as becomes clear from FIG. 11. It is thereby achieved that the adjustment of the fastening part 102 in the axial direction is accompanied by a deflection of the respective transport rail 42, 44, 46 in the region of the respective coupling element 72 in the transverse direction 54. The transport rail 42, 44, 46 is consequently pushed away in the transverse direction 54 by the wedge-like actuating section 112 or counter-section 110 during the axial adjustment of the fastening part 102. Because a plurality of coupling elements 72 are provided in the transport direction 18, as becomes clear from FIG. 3, the respective transport rail 42, 44, 46 can be aligned in parallel with the transport direction 18 over its longitudinal extension.

In the embodiment shown in FIGS. 7 to 11, the respective actuating section 112 has an elongated hole 114 extending in the axial direction, in which elongated hole fixing elements 116 in the form of fastening screws are provided, by means of which, after the respective fastening part 102 has been adjusted in the axial direction, the fastening part 102 can be fastened in place on the guide part 100. Threaded holes 118 are provided on the respective guide part 100, by means of which threaded holes the fixing elements 116 can be screwed into the respective guide part 100.

To align the respective transport rail 42, 44, 46 in the region of the respective coupling element 72, the fastening part 102 is therefore first displaced in the axial direction in order to adjust the respective transport rail 42, 44, 46 in the transverse direction 54. In this case, the screws 104 and the fixing elements 116 are released. After the respective transport rail 42, 44, 46 has been aligned in the transverse direction 54 in the region of the respective coupling element 72, the screws 104 and the fastening elements 116 are tightened for fastening.

Figure 12:
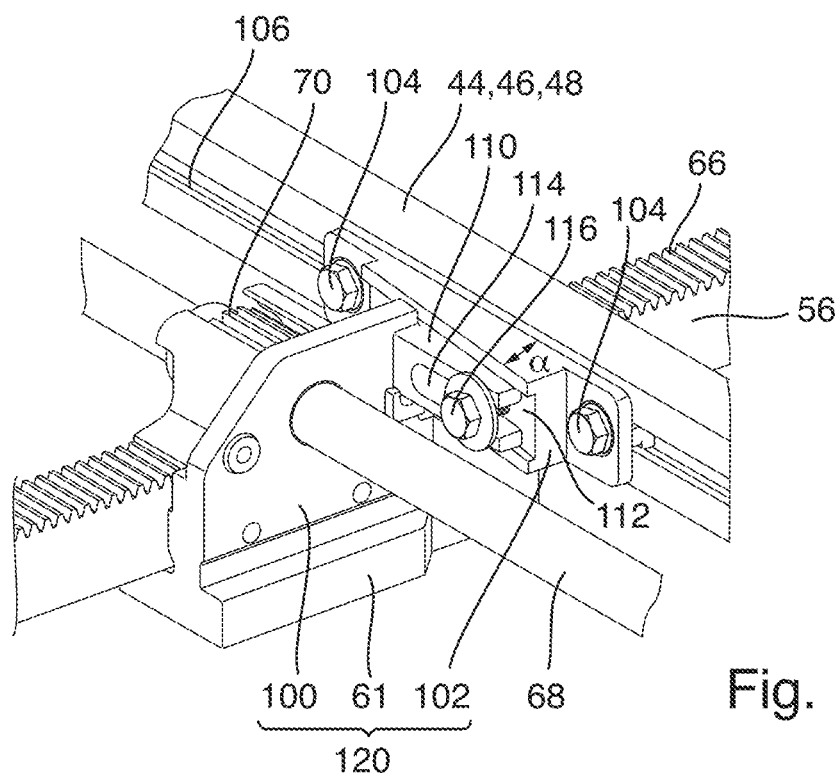
FIG. 12 is a view of an embodiment corresponding to the detail according to FIGS. 7 and 8 with different coupling element.
Figure 13:
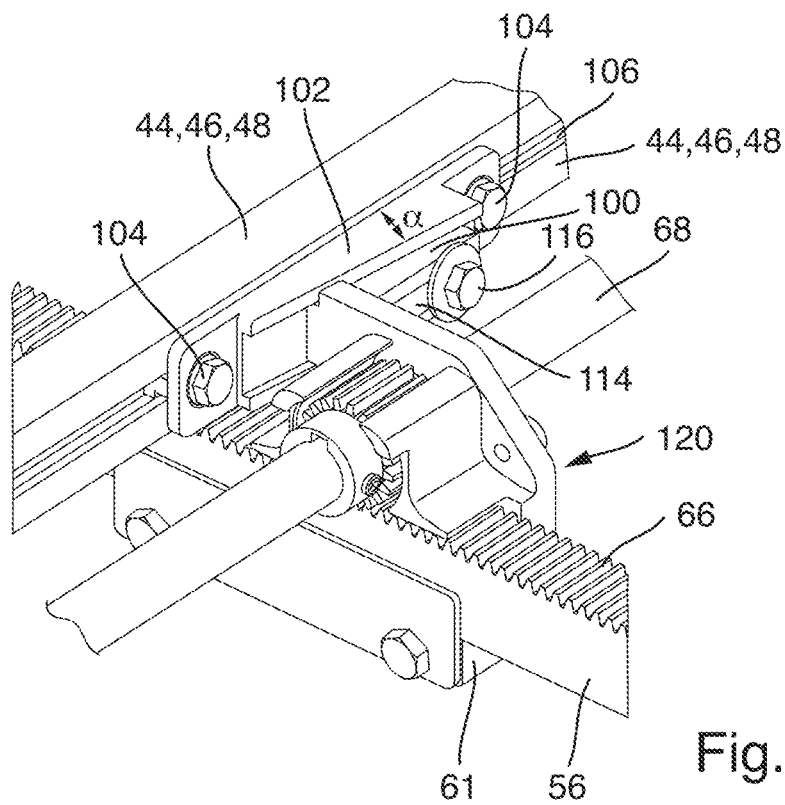
FIG. 13 shows the detail shown in FIG. 12 in another perspective view.

FIGS. 12 and 13 show a further embodiment in which a coupling element 120 is shown that has a different structure from the coupling element 72 shown in FIGS. 7 to 11. In FIGS. 12 to 14, components corresponding to FIGS. 7 to 11 are denoted by corresponding reference signs.

In order to better illustrate the functioning of the coupling member 120 in FIGS. 12 and 13, these figures show a bottom view, which is why the toothing 66 of the respective transverse rod 56 is shown from above. Furthermore, the arrangement according to FIGS. 12 and 13 is such that the respective rotary rod 68 is not arranged between the respective transverse rod 58 and the respective transport rail 42, 44, 46, but laterally next to the respective transport rail 42, 44, 46. Furthermore, the respective guide element 61 is formed integrally with the respective guide part 100.

Corresponding to the coupling elements 72, the coupling elements 120 have, in addition to the guide part 100, a fastening part 102 that can be adjusted on the respective transport rail 42, 44, 46 and can be fixed with fastening screws 104. The fastening part 102 provides an actuating section 112 and the guide part 100 provides a counter-section 110 interacting therewith. Unlike the coupling element 72 shown in FIGS. 7 to 11, the slot 114 is, in the case of the coupling element 120, not provided on the fastening part 102, but on the guide part 100 and there on the counter-section 110. It can also be clearly seen from FIGS. 12 and 13 that the actuating section 112 is designed as a groove-like guide recess in which the counter-section 110 is displaceably arranged. According to the embodiment shown in FIGS. 7 to 11, a fixing element 116 in the form of a fixing screw is also provided in the case of the coupling element 112, by means of which fastening element the counter-section 110 can be fixed on the actuating section 112.

According to the embodiment of FIGS. 7 to 11, the actuating section 112 or the counter-section 110 according to the embodiment according to FIGS. 12 and 13 also encloses an acute angle α with the transport direction.

In order to axially align the respective transport rail 42, 44, 46, according to the embodiment according to FIGS. 7 to 11, the fastening part 102 is first adjusted in the axial direction or transport direction 18 with the screws or fixing means 104 and 116 open to such an extent that the distance in the transverse direction 54 between the respective transport rail 42, 44, 46 and the respective guide part 100 changes during axial adjustment of the associated fastening part 102, specifically until the respective transport rail 42, 44, 46 is aligned in the axial direction in the region of the respective coupling element 120. The fastening screws or fixing means 104 and 116 are then tightened.

The invention claimed is:

1. A transport system (34) for transporting soldering material through a soldering apparatus (10), comprising at least one transport track (38, 40) extending in the transport direction (18), wherein the transport track (38, 40) comprises at least two transport rails (42, 44, 46, 48), wherein a plurality of coupling elements (72, 120) are provided on at least one transport rail (42, 44, 46), wherein the coupling elements (72, 120) comprise guide elements (58, 60, 61) which interact with transverse rods (56) which extend in a transverse direction (54) running transversely to the transport direction (18), and wherein the coupling elements (72, 120) each comprise a guide part (100) having the respective guide element (58, 60, 61) and a fastening part (102) fastened to the respective transport rail (42, 44, 46)

characterized in that the fastening parts (102) are arranged on the respective transport rail (42, 44, 46) so as to be axially adjustable and fixable, in that the fastening parts (102) each have an actuating section (112) and the guide parts (100) each have a counter-section (110) cooperating with the associated actuating section (112), in that the actuating section (112) and/or the counter-section (110) form an acute angle (α) with the transport direction (18), in that the fastening part (102) is adjustable relative to the guide part (100), so that the distance in the transverse direction (54) between the transport rail (42, 44, 46) and the respective guide part (100) changes when the fastening part (102) is axially displaced.

2. The transport system (34) according to claim 1, characterized in that the respective actuating section (112) bears at least in sections against the respective counter-section (110) in a displaceably guided manner.

3. The transport system (34) according to claim 2, characterized in that the respective actuating section (112) or the respective counter-section (110) has a sliding receptacle for the respective counter-section (110) or the respective actuating section (112).

4. The transport system (34) according to claim 1, characterized in that the respective actuating section (112) or the respective counter-section (110) has an elongated hole (114) extending in the transport direction (18), in which elongated hole at least one fixing element (116) is provided for fixing the respective guide part (100) to the respective fastening part (102).

5. The transport system (34) according to claim 4, characterized in that the at least one fixing element (116) is designed as a fastening screw.

6. The transport system (34) according to claim 1, wherein, for the width adjustment of the at least one transport track (38, 40), at least one of the two transport rails (42, 44, 46, 48) is adjustable in a transverse direction (54) running transversely to the transport direction (18), and wherein guide elements (58, 60, 61) adjacent in the transverse direction (54) of transport rails (42, 44, 46) adjustable in the transverse direction (54) are each guided on the same transverse rod (56) so as to be displaceable toward and away from one another in the transverse direction (54).

7. The transport system (34) according to claim 6, characterized in that rotatably drivable rotary rods (68) running parallel to the transport rails (42, 44, 46, 48) are provided, in that the coupling elements (72) each have a rotary receptacle (74) for the respective rotary rod (68) and in that the transverse rods (56) have a toothing (66) on their side facing the respective transport rail (42, 44, 46, 48), which toothing meshes with gear wheels (70) provided on the respective rotary rods (68).

8. The transport system (34) according to claim 7, characterized in that a motor (62) for rotatably driving the respective rotary rod (68) is provided on the respective free end of the respective rotary rod (68).

9. Transport system (34) according to claim 1, characterized in that drivable transport chains are provided that run at least in sections in the transport rails (42, 44, 46, 48).

10. A soldering apparatus (10) in which soldering material can be transported along a transport direction (18), comprising a transport system (34) according to claim 1.

* * * * *